Oct. 31, 1950  J. M. QUINN  2,527,959
APPARATUS FOR AUTOMATICALLY AND CONTINUOUSLY
TREATING PHOTOGRAPHIC FILM
Filed April 23, 1948  3 Sheets-Sheet 1

Joseph M. Quinn
INVENTOR.

BY *Clarence A. O'Brien*
*and Harvey B. Jacobson*
Attorneys

Oct. 31, 1950 J. M. QUINN 2,527,959
APPARATUS FOR AUTOMATICALLY AND CONTINUOUSLY
TREATING PHOTOGRAPHIC FILM
Filed April 23, 1948 3 Sheets-Sheet 2
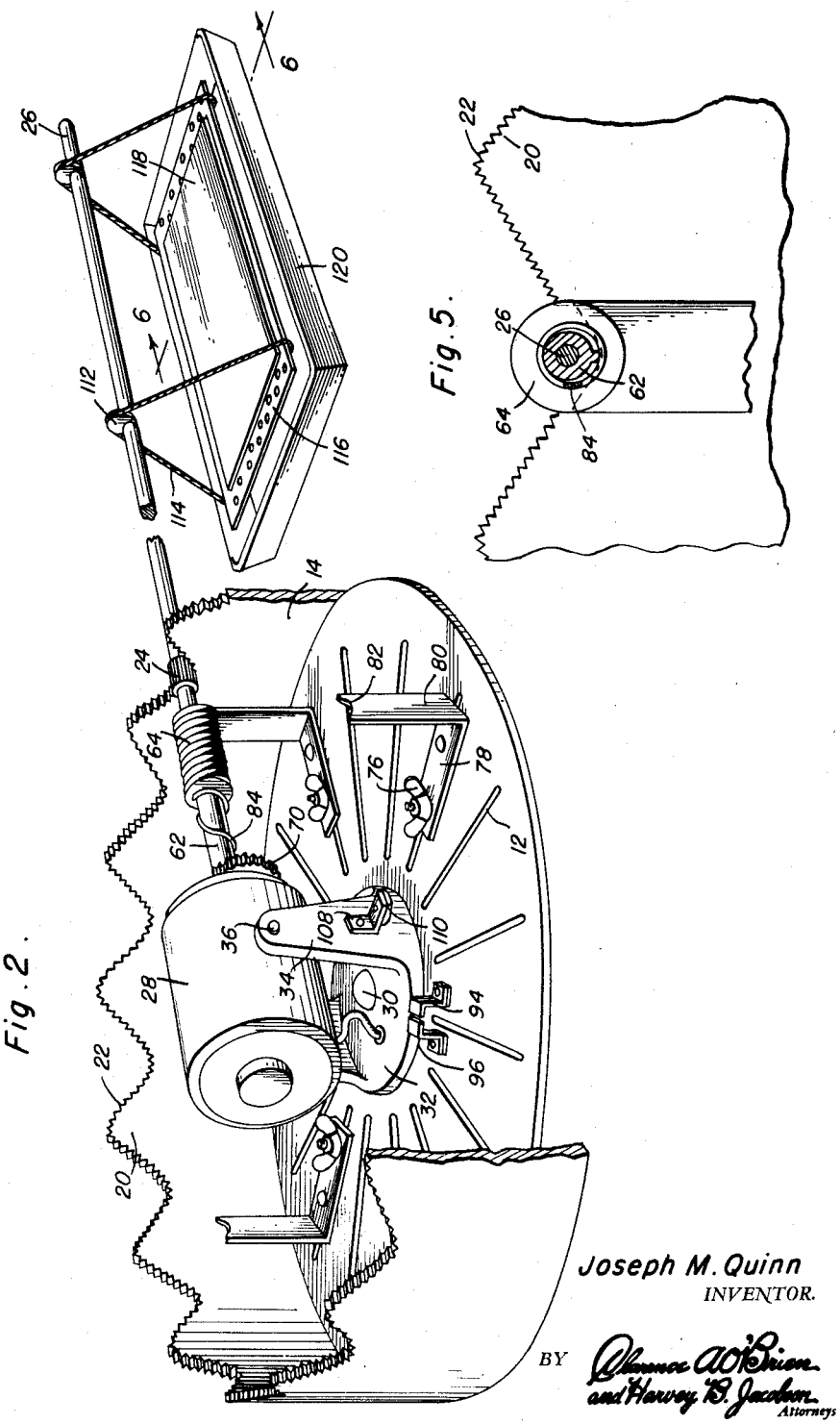
Joseph M. Quinn
INVENTOR.

Oct. 31, 1950     J. M. QUINN     2,527,959
APPARATUS FOR AUTOMATICALLY AND CONTINUOUSLY
TREATING PHOTOGRAPHIC FILM
Filed April 23, 1948     3 Sheets-Sheet 3
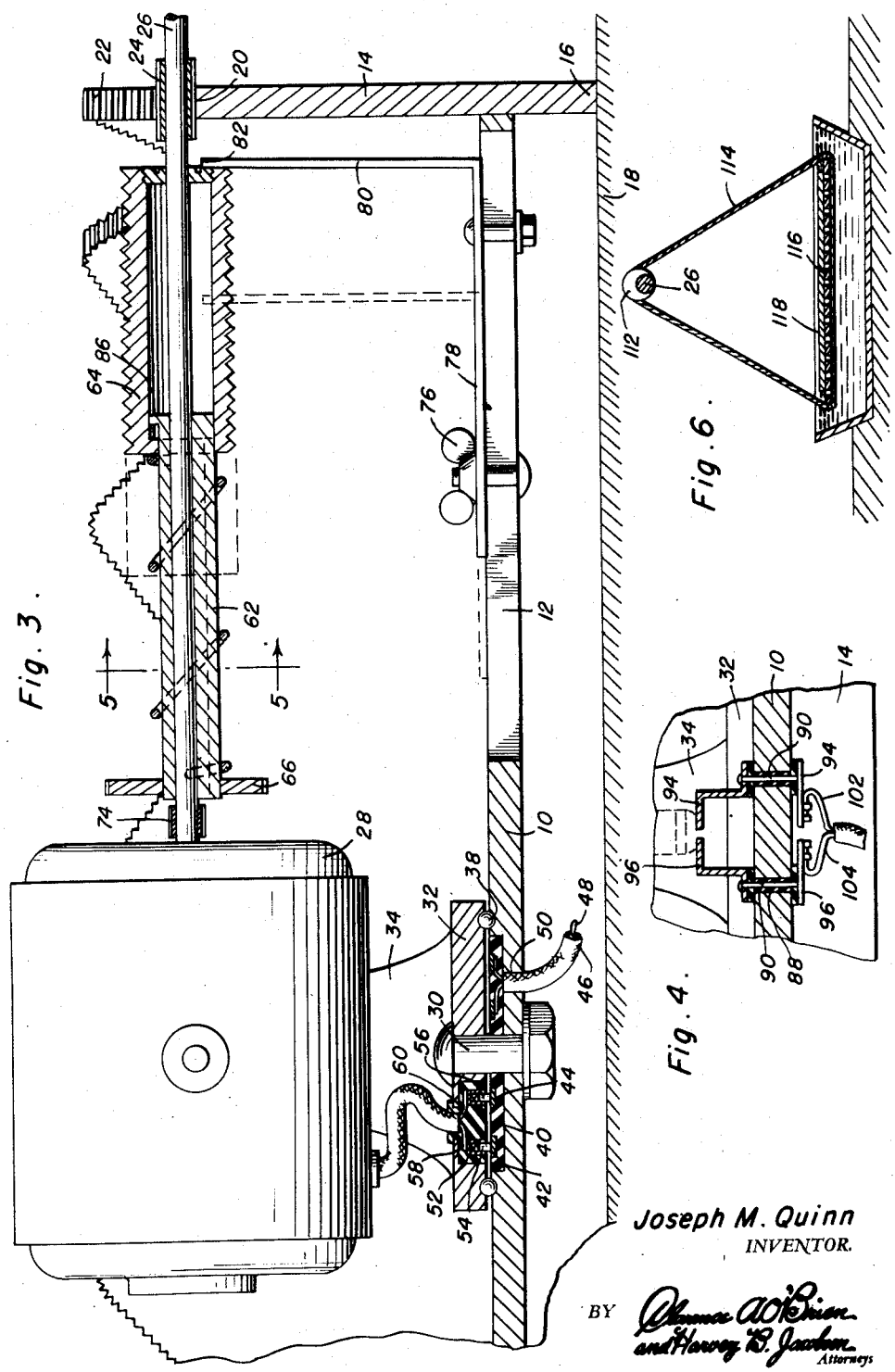
Joseph M. Quinn
INVENTOR.
BY
*Attorneys*

Patented Oct. 31, 1950

2,527,959

UNITED STATES PATENT OFFICE 2,527,959

APPARATUS FOR AUTOMATICALLY AND CONTINUOUSLY TREATING PHOTOGRAPHIC FILM

Joseph M. Quinn, Scranton, Pa.

Application April 23, 1948, Serial No. 22,832

10 Claims. (Cl. 95—89)

This invention relates to new and useful improvements in devices for treating photographic film, and the primary object of the present invention is to provide an apparatus for automatically and continuously treating photographic film until the same is developed.

Another important object of the present invention is to provide an apparatus for processing small amounts of photographic film or other similar material by automatically timing each step in the process so that the film will be retained in a selective treating area for a predetermined period of time.

Another object of the present invention is to provide an apparatus for automatically and continuously treating photographic film including a film holding member and novel and improved means for agitating the film holding member as the same is moved automatically from one treating zone into the next.

Another object of the present invention is to provide an apparatus for automatically and continuously treating photographic film or the like including a plurality of adjustable racks for engaging a rotary element for predetermined timed intervals whereby a film will be disposed in a selected treating zone for predetermined periods of time.

Another object of the present invention is to provide an apparatus for automatically and continuously treating photographic film and the like including a driving member and novel and improved guide means for engaging the driving member to raise and lower the driving member in a circumferential path.

Another important object of the present invention is to provide a film holding member and novel and improved means for agitating the same and the film supported thereby as the apparatus is moved in a continuous path to treat film.

A further object of the present invention is to provide an apparatus for treating photographic film in a continuous and automatic cycle that is extremely small and compact in structure and which is efficient and durable in operation.

A still further object of the present invention is to provide an apparatus for automatically and continuously treating photographic film that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a fragmentary perspective view of the present invention, and with parts thereof broken away and shown in section;

Figure 3 is an enlarged longitudinal vertical sectional view taken substantially on the plane of section line 3—3 of Figure 1, and showing the driving gear or pinion engaged with the guide track;

Figure 4 is an enlarged vertical sectional view of the present invention taken substantially on the plane of section line 4—4 of Figure 1, and showing the manner in which the treating lamp is electrically actuated;

Figure 5 is a vertical sectional view taken substantially on the plane of section line 5—5 of Figure 3; and Figure 6 is a transverse vertical sectional view taken substantially on the plane of section line 6—6 of Figure 2.

Figure 1:
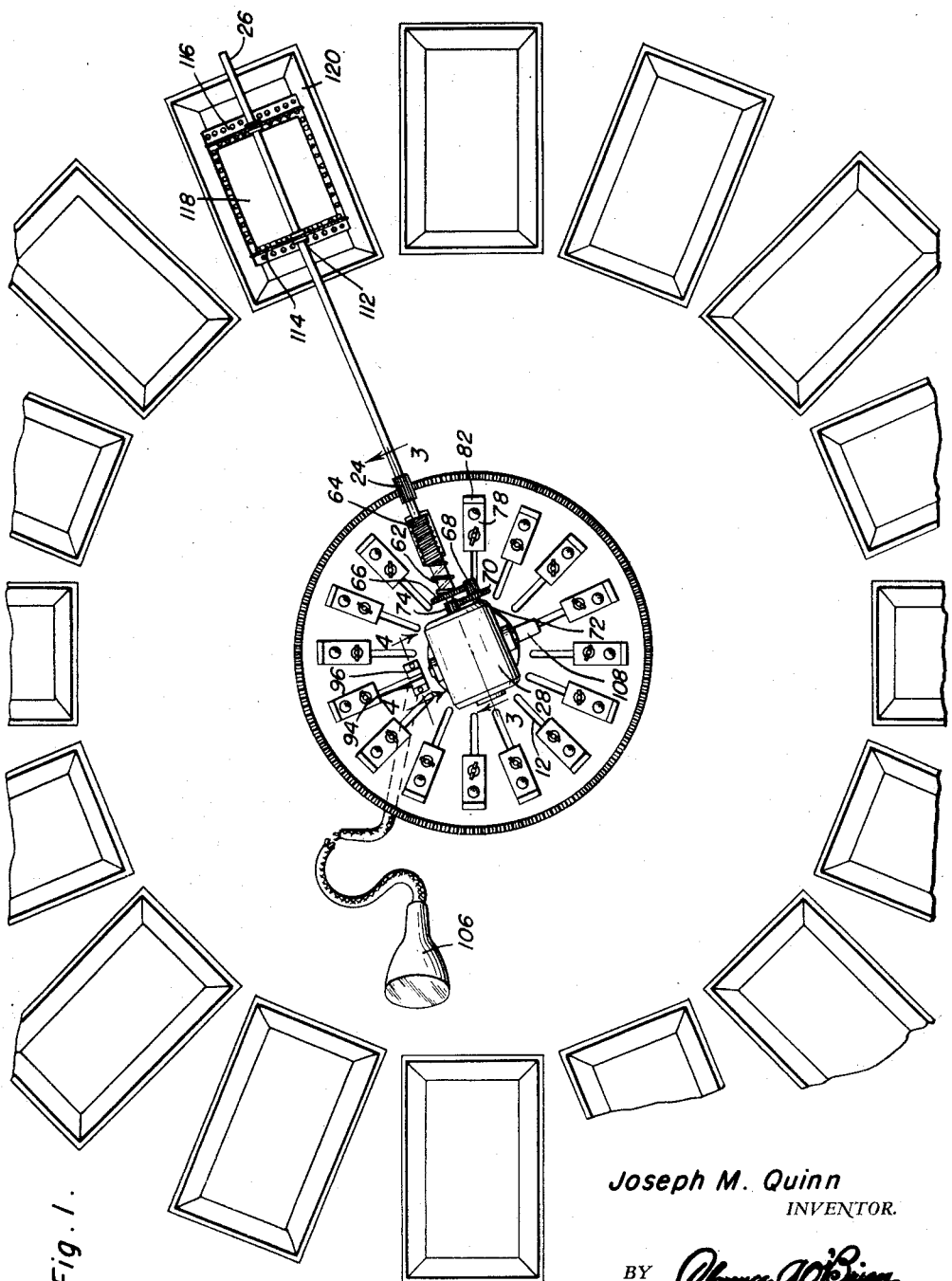
Figure 1 is a top plan view of the present apparatus and with parts of the treating compartments broken away.

Referring now to the drawings in detail, wherein, for the purpose of illustration, there is disclosed a preferred embodiment of the present invention, the numeral 10 represents an annular support plate or base having a plurality of radial slots or openings 12. The outer annular edge of this support plate 10 is secured in any suitable manner to the inner periphery of an annular wall or guide track 14 and above the lower edge 16 of the guide track 14, so that the support plate 10 will be raised or elevated from a supporting structure or bearing surface 18.

The upper undulated edge 20 of the guide track 14 is provided with a continuous series of teeth 22 forming a bearing surface for an annular gear or pinion 24 that is suitably fixed on the drive shaft 26 of a preferably electric motor 28.

Extending through the center of the support plate 10 is an adjustable pivot pin or bolt 30 that retains a motor mounting 32 relative to the support plate 10. This motor mounting 32 includes a pair of upstanding arms, ears or furcations 34 that are pivoted, as at 36, to the outer surface of the motor 28. The motor mounting 32 is spaced relative to the upper face of the support plate 10 by ball bearings 38 that reduce the frictional movement of the motor mounting during the rotation of the same upon the support plate 10.

Recessed in the upper face of the support plate 10 is an insulated disk or plate 40, in the upper face of which there is recessed a pair of spaced annular conductive surfaces or rings 42 and 44 that are connected to circuit wires 46 and 48 which extend through an opening 50 in the support plate 10, and hence to a suitable source of electric current.

An insulated plug 52 is carried by the motor mounting 32 and recessed in the lower face of the plug 52 is a pair of spring-urged conductive pins 54 and 56 that engage the rings 42 and 44, respectively. The pins 54 and 56 are electrically connected to a pair of wires 58 and 60 leading from the motor 28 whereby there will be a circuit between the wires 46 and 48 and the motor 28 when the wires 46 and 48 are connected to a source of electric current, without binding or twisting the motor wires 58 and 60 as the said motor mounting 32 is rotated.

Rotatably positioned on the drive shaft 26 is a sleeve or cylindrical element 62 that is keyed to a worm gear 64 in such a manner that the worm gear is rotated by and with the sleeve. However, the worm gear is slidably mounted on the sleeve for a purpose which will later be more fully apparent.

Fixed on the sleeve 62 is an annular gear or toothed wheel 66 that engages a reduced annular gear 68 carried by a further annular gear 70. This latest gear, 70, is suitably fixed to the reduced gear 68 to rotate therewith and is rotatably supported together with the reduced gear 68 on an auxiliary shaft or axle 72 carried by the motor 28. Also, the gear 70 engages a further reduced gear 74 that is suitably fixed on the drive shaft 26 of the motor 28. It is understood that the gears 66, 68, 70 and 74 are so arranged that the sleeve 62 and hence the worm 64 will be rotated at a reduced rate of speed to the drive shaft 26 of the motor 28, and more particularly whereas the drive shaft 26 rotates at approximately 30 R. P. M., the sleeve 62 will rotate at approximately one revolution per minute.

Slidably and adjustably secured to the support plate 10, through the medium of adjustable fasteners 76 that engage selective slots 12, are the horizontal legs 78 of a plurality of angle members 80, the longitudinal legs of which are notched or rounded to form arcuate racks or guides 82 for engaging the worm 64.

Embracing the sleeve 62 and biased between the gear 66 and the worm 64 is a coil spring 84 that normally urges the worm 64 outwardly from the gear 66. It is noted that the sleeve 62 is provided with a suitable stop 86 that will limit the sliding movement of the worm 64 on the sleeve 62 in one direction.

Extending through the support plate 10, adjacent the motor mounting 32, is a pair of insulated sleeves 88 that receive conductive holders 90. These holders 90 are connected to a pair of spaced and angulated contact members 94 and 96 that rise from the support plate 10, and a pair of conductive plates 98 and 100 are disposed beneath the support plate 10 and which are connected to circuit wires 102 and 104 that lead to a suitable lamp 106. One of the wires, either 102 or 104, is connected to a suitable source of electric current.

Removably or fixedly secured on one of the furcations 34, by any suitable means, is an insulated support bracket 108 that includes a conductive element 110 which will bridge the gap between the members 94 and 96 as the mounting 32 is rotated to complete a circuit to the lamp 106.

Fixed on the drive shaft 26 is a pair of eccentric pulleys 112 that engage flexible suspension cords 114 which support a perforated plate 116. As the drive shaft 26 rotates, the pulleys 112 will also rotate to agitate the plate 116 and a film 118 supported thereon.

In practical use of the present apparatus, a plurality of circumferentially spaced containers or solution compartments 120 are disposed adjacent the guide 14 and the lamp 106 is suitably fixed on a supporting element to oppose a selected of the compartments 120.

As the drive shaft 26 of the motor 28 rotates, the gear 24 will engage the toothed and undulated upper edge 20 of the guide 14 so that the motor 28 will pivot or rotate in a circumferential path and will work or rock up and down as the gear 24 follows the contour of the guide track.

When the gear 24, traveling on the guide track, moves to the time setting support 80, the worm gear 64 will engage the rack or notch 82 to raise the gear 24 from engagement with the guide track. The drive shaft 26 will continue to rotate and the film 118 will continue to be agitated due to the action of the pulleys 112. However, now the worm 64 being driven will move toward the gear 66 and the spring 84 will be compressed and in tension. After the worm 64 has been rotated and moved inwardly sufficiently to disengage the time-setting support 80, the gear 24 will again engage the guide track and the spring 84 will return the worm 64 to its normal position for engaging a further time-setting support 80 as the motor 28 moves in a circumferential path.

Obviously, by adjusting the time-setting support 80 so that the same will engage the worm 64 at a selective point thereof, the film 118 will be disposed in a selected compartment 120 for predetermined intervals or periods of time. It is noted that as the motor 28 is rotated to a selected zone or compartment, the film supported on the plate 116 will be treated by lamp 106 which is preferably white so that the white rays of light radiated therefrom will properly treat the film for a predetermined length of time. The compartments 120 contain various solutions for the treating of photographic film, and properly wash, rinse, harden, and bleach the film as the same is rotated together with the motor 28 in a circumferential path. Although there is shown in the drawings only one lamp 106 for treating or for exposing the film to a white light, it is noted that any suitable number of lamps may be employed for properly treating the film or for aid in drying the film if such is desirable.

The above apparatus will obviously treat a film in such a manner that the same will be entirely developed in a continuous circumferential path as the motor is actuated. Such a construction will obviously eliminate the necessity for manually inserting film into treating zones or compartments and will permit the same to be observed by a single operator in a convenient manner. The total number of solution compartments could be reduced and the total number of time setting supports 80 could be increased or reduced to retain the film in a selected treating zone for desirable timed intervals.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An apparatus for automatically and continuously treating photographic film comprising a support, a driving shaft carried by the support, an annular guide track disposed about the support, a gear fixed on said driving shaft for rotation therewith, said guide track having an undulated and toothed bearing surface for engaging the gear to raise and lower the driving shaft in a circumferential path, means for disengaging the gear with the guide track upon movement of said driving shaft in a circumferential path, a film holding member carried by the driving shaft, and means carried by the driving shaft for agitating said film holding member during rotation of the driving shaft.

2. The combination of claim 1 wherein said film holding member includes a pair of suspension cords, and said agitating means includes a pair of eccentric pulleys carried by the driving shaft and engaging the cords.

3. An apparatus for automatically and continuously treating photographic film comprising a support, a driving shaft carried by the support, an annular guide track disposed about the support, a gear fixed on said driving shaft for rotation therewith, said guide track having an undulated and toothed bearing surface for engaging the gear to raise and lower the driving shaft in a circumferential path, a worm rotatably carried by the driving shaft, means operatively connecting the worm to the driving shaft for rotating the former, and a plurality of adjustable stops including guides for the worm carried by the support for engaging the worm during movement of said driving shaft in a circumferential path to disengage the gear from the guide track.

4. The combination of claim 3 wherein said means operatively connecting the worm to the driving shaft for rotating the former includes gear means for rotating the worm at a reduced rate of speed than the driving shaft.

5. An apparatus for continuously and automatically treating photographic film comprising a support, a motor rotatably carried by the support including a drive shaft, an annular guide track carried by the support including an undulated and toothed bearing surface, a gear fixed on the drive shaft of the motor for engaging the bearing surface of said guide track, a worm rotatably carried by the drive shaft of the motor, means connecting the drive shaft of the motor to the worm for rotating the latter at a reduced rate of speed than the former, and means adjustably carried by the support for engaging the worm to disengage the gear from the bearing surface of the guide track for a predetermined interval.

6. An apparatus for continuously and automatically treating photographic film comprising a support, a motor rotatably carried by the support including a drive shaft, an annular guide track carried by the support including an undulated and toothed bearing surface, a gear fixed on the drive shaft of the motor for engaging the bearing surface of said guide track, a worm rotatably carried by the drive shaft of the motor, means connecting the drive shaft of the motor to the worm for rotating the latter at a reduced rate of speed than the former, means adjustably carried by the support for engaging the worm to disengage the gear from the bearing surface of the guide track for a predetermined interval, a film holder including a plurality of suspension cords, and eccentric pulleys fixed on the drive shaft of the motor engaging the cords to agitate the film holder during rotation of the drive shaft.

7. An apparatus for continuously and automatically treating photographic film comprising a support, a holder mounted on the support for rotation, a rotary shaft carried by said holder, a guide track about said support and including an undulated and toothed bearing surface, a gear carried by and rotatable with the rotary shaft and engaging the guide track for raising and lowering the rotary shaft in a circumferential path and for rotating said holder on said support, a worm journaled for rotation on said rotary shaft, and means carried by said support for engaging the worm during rotation of the holder to disengage the gear from the track for a predetermined interval.

8. An apparatus for continuously and automatically treating photographic film comprising a support, a holder mounted on the support for rotation, a rotary shaft carried by said holder, a guide track about said support and including an undulated and toothed bearing surface, a gear carried by and rotatable with said shaft and engaging the guide track for raising and lowering the rotary shaft in a circumferential path and for rotating said holder on said support, a worm journaled for rotation on said rotary shaft, said support having a slot therein disposed radially of the pivot of the holder, an angle member having a portion for engaging the worm to disengage the gear from the guide track during rotation of said holder, and means received in the slot and connected to the angle member for adjusting the angle member radially of the holder.

9. An apparatus for continuously and automatically treating photographic film comprising a support, a holder mounted on said support for rotation, a rotary shaft carried by said holder, a guide track completely surrounding the holder and including an endless undulated toothed bearing surface, teeth carried by and rotatable with said shaft and engaging the toothed surface of said guide track for raising and lowering the rotary shaft in a circumferential path and for rotating said holder on said support, a screw journaled for rotation on said shaft, and means carried by said support for engaging the screw during rotation of the holder to disengage the teeth carried by the shaft from the toothed surface of said track.

10. An apparatus for continuously and automatically treating photographic film comprising a support, a holder mounted on said support for rotation, a rotary shaft carried by said holder, a guide track completely surrounding the holder and having a continuous undulated edge, means carried by and rotatable with the shaft and frictionally engaging the undulated edge for raising and lowering the shaft in a circumferential path and for rotating the holder on the support, a worm journaled for rotation on said shaft, and means carried by said support for engaging the screw during rotation of the holder to disengage the means carried by and rotatable with the shaft from the undulated edge for a predetermined interval.

JOSEPH M. QUINN.

REFERENCES CITED

The following references are of record in the file of this patent:

UNITED STATES PATENTS

| Number | Name | Date |
| --- | --- | --- |
| 551,206 | Girbau | Dec. 10, 1895 |
| 1,254,300 | Baker | Jan. 22, 1918 |
| 1,907,252 | Debrie | May 2, 1933 |
| 1,961,338 | Crabtree | Jan. 5, 1934 |
| 2,194,345 | Winans | Mar. 19, 1940 |
| 2,325,120 | Forse | July 27, 1943 |